United States Patent [19]
Seib et al.

[11] 3,926,594
[45] Dec. 16, 1975

[54] WATER TRAP FOR PITOT STATIC SYSTEM

[75] Inventors: James N. Seib, Williams, Ind.; Harry G. Willis, Plainfield, Ill.

[73] Assignee: The United States of America as represented by the Secretary of the Navy, Washington, D.C.

[22] Filed: Jan. 6, 1975

[21] Appl. No.: 538,659

[52] U.S. Cl. .................... 55/159; 55/423; 55/465; 73/212
[51] Int. Cl.² ........................................ B01D 45/00
[58] Field of Search ................ 55/36, 183–185, 55/159, 270, 423, 424, 465; 73/182, 200, 212, 395

[56] References Cited
UNITED STATES PATENTS

| | | | |
|---|---|---|---|
| 821,172 | 5/1906 | Kjerner | 55/465 |
| 2,204,367 | 6/1940 | Kollsman | 73/212 |
| 2,278,798 | 4/1942 | Riccardi | 55/465 |
| 2,510,986 | 6/1950 | Larkin | 73/212 |
| 3,267,992 | 8/1966 | Werner et al. | 73/212 X |

*Primary Examiner*—Charles N. Hart
*Assistant Examiner*—Richard W. Burks
*Attorney, Agent, or Firm*—R. S. Sciascia; Paul S. Collignon

[57] ABSTRACT

A water trap for a pitot static system having an inner chamber positioned within an outer chamber. A first pipe carries a mixture of air and water into the inner chamber wherein the water separates from the air and a second pipe carries the air to an instrumentation gauge. At least one drain hole is provided in the inner chamber for permitting water to drain into the outer chamber, and at least one drain opening is provided in the outer chamber for draining water from the outer chamber.

4 Claims, 2 Drawing Figures

WATER TRAP FOR PITOT STATIC SYSTEM

BACKGROUND OF THE INVENTION

The present invention relates to a trap for removing water from air which enters into a pitot static tube. Separation of water from the air is necessary as low temperatures associated with high altitudes will cause the water to freeze in the small pitot tube pipes causing loss of speed readings and altimetry reading. Also, frozen water causes cracks in the tube thereby either causing errors in the readings or a complete loss of readings.

A pitot tube is an open-ended tube usually of circular section pointing directly into the flow of a fluid. A pitot static tube is an instrument for the measurement of flow velocity made by combining in one unit a pitot tube and a static head tube. Pitot static systems have traditionally used ordinary plumbing "tees" for removing water. Water and air enter into one arm of a tee and gravity is relied upon to permit water to drop out into a standpipe which is connected to another arm of the tee. The air, having water removed, leaves the tee through the third arm which is attached to appropriate aircraft instrumentation. After a flight, a plug cap is removed from the standpipe and any water that has been collected is removed.

One disadvantage of a tee system is that a small slug of water moves down into the standpipe and forms a hydraulic ram which prevents the slug of water from flowing down the standpipe. Thus, only a very small amount of water is collected in the standpipe and the excess stays inside the tee where water is susceptible to freezing.

SUMMARY OF THE INVENTION

The present invention relates to a water separator which separates water from air by gravity. An inner chamber is positioned within an outer chamber and air and water from a pitot tube flow through a first pipe into the inner chamber. The water separates by gravity and falls to the bottom of the inner chamber. A second pipe, which is displaced in alignment from the first pipe, carries the air to an instrumentation gauge. Drain holes are provided in the top and bottom walls of the inner chamber for draining water into the outer chamber and drains are also provided in the outer chamber for removing water from the outer chamber.

It is therefore a general object of the present invention to provide a water trap for a pitot static system.

Other objects, advantages and novel features of the invention will become apparent from the following detailed description of the invention when considered in conjunction with the accompanying drawing.

DESCRIPTION OF THE PREFERRED EMBODIMENT

Figure 1:
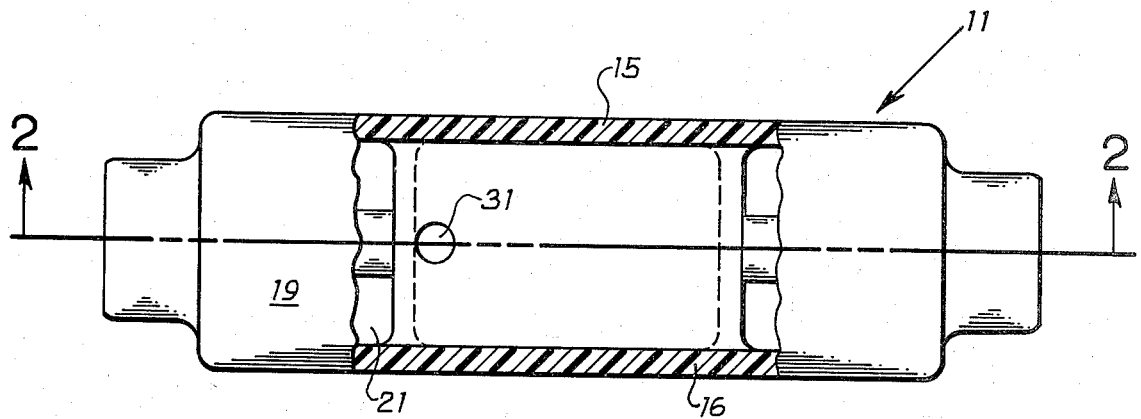
FIG. 1 is a top view, partially broken away, of a preferred embodiment of the present invention.

Referring now to the drawing, there is shown a water trap 11 adaptable to be used with a pitot static tube system. An outer chamber 12, which is preferably made of a transparent plastic material, is provided with an entrance port 13 and an exit port 14. Ports 13 and 14 are threaded so that pipes can be readily attached thereto. Outer chambe 12 is enclosed, except for threaded openings therein, and is comprised of sides 15 and 16, ends 17 and 18, top 19, and bottom 21. Drain ports 22 and 23 are provided in bottom 21 and a third drain port 24 is provided in end 18 for the draining, by gravity, of water that collects in chamber 12. Ports 22, 23, and 24 are threaded so that pipes can be readily attached thereto for conveying water to a desired dumping station. Four holes 20 are provided in chamber 12 for mounting to an aircraft.

An inner chamber 25 is provided within chamber 12 and a portion of sides 15 and 16 of outer chamber 12 serve as sides for inner chamber 25. Inner chamber 25 also has ends 26 and 27, top 28 and bottom 29. Drain holes 31 and 32 are provided in top 28 and bottom 29, respectively, for draining water that collects in inner chamber 25. While water will normally drain from inner chamber 25 through hole 32, hole 31 is provided in the event the aircraft using the water trap is flying upside down or is performing maneuvers.

Figure 2:
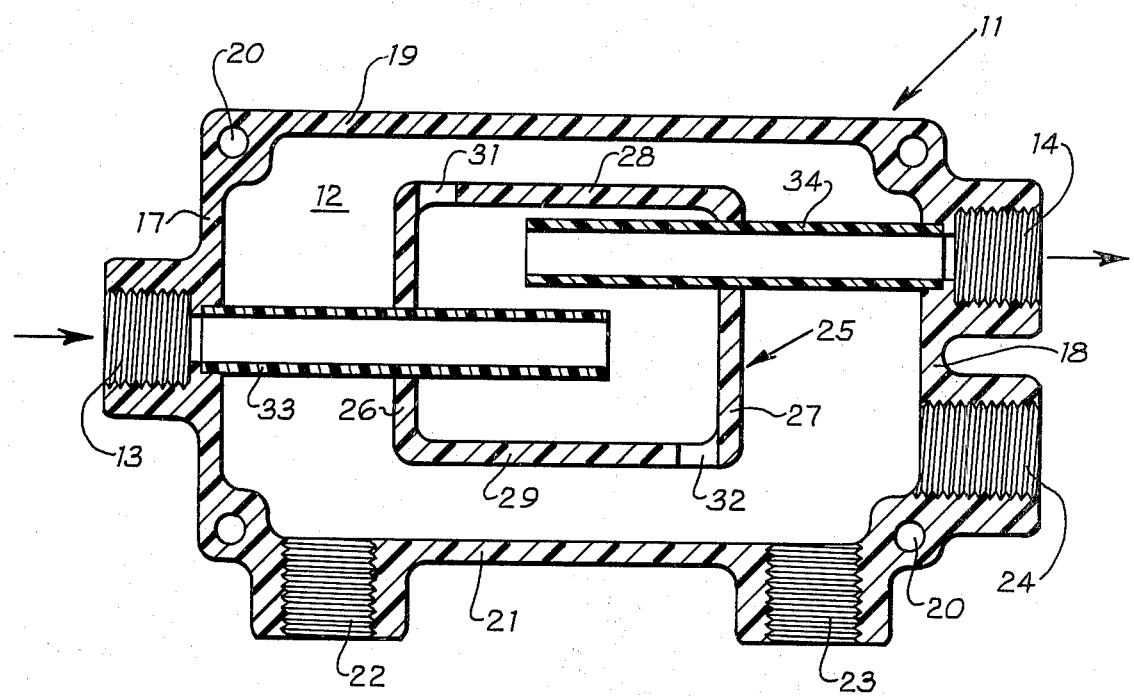
FIG. 2 is a sectional view taken on line 2—2 of FIG. 1.

A first tubular pipe 33 connects inner chamber 25 with entrance port 13 and a second tubular pipe 34 connects inner chamber 25 with exit port 14. As best shown in FIG. 2 of the drawings, pipe 34 is positioned above pipe 33 and both pipes 33 and 34 extend beyond the middle of chamber 25 so that their ends overlap. This arrangement of pipes 33 and 34 prevents water which passes through pipe 33 from entering pipe 34.

OPERATION

Water trap 11 is installed in a pitot static system in an aircraft with entrance port 13 being connected to a pitot tube and exit port 14 being connected to an instrumentation gauge. In operation, a mixture of air and water will enter trap 11 through port 13 and will flow through pipe 33 into inner chamber 25. Water separates, by gravity, from the air, and collects in the bottom of inner chamber 25 and will drain through either hole 32 or hole 31 into the outer chamber 12. Air only will flow through pipe 34 to appropriate instrumentation gauges. Water that collects in the bottom of outer chamber 12 can be drained through ports 22, 23, and 24.

Obviously many modifications and variations of the present invention are possible in the light of the above teachings. It is therefore to be understood that within the scope of the appended claims the invention may be practiced otherwise than as specifically described.

We claim:

1. A water separator for a pitot static system comprising,
    a first enclosed chamber having an inlet for receiving air and water from a pitot tube and an outlet for providing air to an instrumentation gauge,
    a second enclosed chamber positioned within said first enclosed chamber,
    a first tubular pipe connecting said inlet and said second enclosed chamber, and a second tubular pipe connecting said outlet and said second enclosed chamber, the axes of said first and second tubular pipes being displaced from one another with the ends of said pipes extending into said second enclosed chamber overlapping one another,
    at least one drain opening in said second enclosed chamber for draining water from said second enclosed chamber into said first enclosed chamber, and at least one drain opening in said first enclosed chamber for draining water from said first enclosed chamber.

2. A water separator for a pitot static system as set forth in claim 1 wherein said second tubular pipe is positioned above said first tubular pipe.

3. A water separator for a pitot static system as set forth in claim 1 wherein said first and second enclosed chambers are made of transparent plastic material.

4. A water separator for a pitot static system as set forth in claim 1 having first and second drain holes in said second enclosed chamber, said first drain hole being in a wall above said first and second pipes and said second drain hole being in a wall below said first and second pipes.

* * * * *